United States Patent [19]

Baney et al.

[11] 4,035,355

[45] July 12, 1977

[54] ANAEROBICALLY CURING SILICONE COMPOSITIONS

[75] Inventors: Ronald H. Baney; Ollie W. Marko, both of Midland, Mich.

[73] Assignee: Dow Corning Corporation, Midland, Mich.

[21] Appl. No.: 639,545

[22] Filed: Dec. 10, 1975

[51] Int. Cl.$^2$ .......................................... C08G 77/04
[52] U.S. Cl. ............................ 260/46.5 Y; 156/294; 156/329; 260/46.5 UA; 260/46.5 G; 526/230; 526/279
[58] Field of Search .............. 260/46.5 UA, 46.5 Y, 260/46.5 G; 526/230, 279; 156/294, 329

[56] References Cited

U.S. PATENT DOCUMENTS

| 2,793,223 | 5/1957 | Merker | 260/46.5 UA |
| 2,922,806 | 1/1960 | Merker | 260/46.5 UA |
| 2,956,044 | 10/1960 | Merker | 260/46.5 UA |

*Primary Examiner*—Melvyn I. Marquis
*Attorney, Agent, or Firm*—George A. Grindahl

[57] ABSTRACT

Compositions comprising certain acrylate-containing polyorganosiloxanes and a hydroperoxy polymerization initiator are anaerobically curing sealant compositions. For example, a composition comprising a polyorganosiloxane consisting essentially of 42 mole percent trimethylsiloxane units and 58 mole percent methacryloxypropyl silsesquioxane units and cumene hydroperoxide remained uncured for several days in the presence of oxygen but cured to a solid, insoluble sealant when placed on the threads of an iron bolt and a nut was threaded onto the bolt.

10 Claims, No Drawings

ANAEROBICALLY CURING SILICONE COMPOSITIONS

BACKGROUND OF THE INVENTION

1. Field of the Invention

This invention relates to polyorganosiloxane sealant compositions which cure in the absence of oxygen.

2. Description of the Prior Art

Anaerobically curing sealant compositions have been known for a long time. The "oxygenated" acrylate-containing anaerobic monomers of Burnett, et al, U.S. Pat. No. 2,628,178 were subsequently improved by Krieble, U.S. Pat. No. 2,895,950. Gorman, et al., U.S. Pat. No. 3,425,988 extended the concept of anaerobic sealants from the polyalkylene either monomers of Burnett, et al. and Krieble to polymerizable monomers prepared by reacting an organic polyisocyanate with an acrylate ester containing a hydroxy or amine group in the nonacrylate portion thereof. Further improvements in anaerobically curing sealant compositions have been confined essentially to components other than the polymerizable monomer.

Polyorganosiloxane compositions are well known to possess low temperature flexibility and high temperature stability that are superior to most "organic" polymers. In spite of the fact that acrylate-containing silanes and siloxanes have been known for a long time and polymerization and copolymerization of silicon-containing acrylates have been reported, and anerobically curing polyorgnosiloxane composition has not been disclosed.

Merker, U.S. Pat. No. 2,793,223 describes the preparation of siloxanes having units of the formula

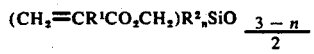

and the copolymeric siloxanes having copolymerized therewith units of the formula

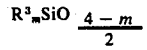

where $n = 1$ to 2, $m = 1$ to 3, $R^1$ is H or $CH_3$, $R^2$ is a monovalent hydrocarbon radical and $R^3$ is acetoxymethyl, monovalent hydrocarbon radicals or halogenated monovalent hydrocarbon radicals.

Merker, in U.S. Pat. No. 2,956,044 teaches a process for the preparation of modified acrylic resins which comprises subjecting the compositions of U.S. Pat. No. 2,793,223, where $m$ can be zero as well as 1 to 3 inclusive, to conditions of polymerization capable of generating free radicals. Furthermore, Merker in U.S. Pat. No. 2,922,806 describes organopolysiloxanes containing polymeric units of the formula

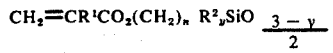

and copolymers therewith having additional copolymeric units of the formula

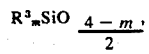

where $n = 2$ to 4, $y = 0$ to 1, $R^1$ is H or $CH_3$, $R^2$ is a monovalent hydrocarbon radical free of aliphatic unsaturation and $R^3$ is a monovalent hydrocarbon radical or a halogenated monovalent hydrocarbon radical. The compositions of U.S. Pat. No. 2,922,806 can be further polymerized by exposure to "vinyl polymerizing conditions."

The anaerobically curing compostions of Krieble and Gorman, et al., said to be stable if a moderate amount of air is present with the composition, for example, a small layer of air in a properly shaped and sealed glass container or a polyethylene container. It is well known that polyorganosiloxanes are permeable to oxygen and contain relatively large amounts of dissolved oxygen. It was therefore surprising to find that certain acrylate-containing polyorganosiloxane compositions can be used to formulate anaerobically curing compositions in spite of this relatively large solubility of oxygen in polyorganosiloxanes.

SUMMARY OF THE INVENTION

It is an object of the present invention to provide polyorganosiloxane compositions which will remain uncured for long period of time in the presence of oxygen but which will cure in the absence of oxygen. It is another object of this invention to provide anaerobically curing compositions which possess improved thermal stability. These and other objects will be obvious to one skilled in the art upon reading the following description of the invention.

This invention relates to anaerobically curing compositions comprising certain methacrylate- and/or acrylate-containing polyorganosiloxanes and a hydroperoxy polymerization initiator, said polyorganosiloxane having at least two acrylate-containing siloxane units and a degree of functionality of from 2.2 to 5.0.

For the purposes of this invention the term acrylate-containing is a general expression and is to be taken as including silicon-bonded acryloxyalkyl and/or silicon-bonded methacryloxyalkyl radicals of the formula

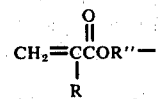

where R is H or $CH_3$ and R" is a divalent alkylene radical of from 1 to 4 carbon atoms inclusive.

The degree of functionality of a polyorganosiloxane can be calculated as hereinafter described.

DESCRIPTION OF THE INVENTION

This invention relates to an anaerobically curing composition comprising (a) a polyorganosiloxane, soluble in at least one common organic solvent, consisting essentially of at least two siloxane units of the formula

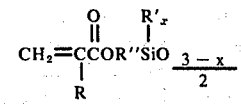

where R is H or $CH_3$, R' is an organic radical free of aliphatic unsaturation selected from the group consisting of monovalent hydrocarbon radicals and halogenated monovalent hydrocarbon radicals, R" is a divalent alkylene radical of from 1 to 4 inclusive carbon atoms and $x$ is 0, 1 or 2, any remaning siloxane units in the polyorganosiloxane having the formula $$R'_y SiO_{\frac{4-y}{2}}$$

wherein R' is as defined above and y is an integer from 0 to 3 inclusive, said polyorganosiloxane having a degree of functionality of from 2.2 to 5.0, and (b) an effective amount of a hydroperoxy initiator.

Polyorganosiloxane (a) consists essentially of acrylate-containing siloxane units of the formula $$CH_2=\overset{R'_x}{\underset{R}{C}}\overset{O}{\underset{}{C}}OR''SiO_{\frac{3-x}{2}}$$

alone or in combination with siloxane units of the formula $$R'_y SiO_{\frac{4-y}{2}}$$

As indicated above, the term acrylate-containing is meant to include polyorganosiloxanes having siloxane units bearing an acryloxyalkyl (R=H) radical and/or siloxane units bearing a methacryloxyalkyl radical (R=CH$_3$).

The divalent alkylene radical R'' is free of unsaturation and consists of from 1 to 4 carbon atoms. Examples of R'' include —CH$_2$—, —CH$_2$CH$_2$—, —CH$_2$CH$_2$CH$_2$—, —CH$_2$CH(CH$_3$)—, —CH$_2$CH$_2$CH$_2$CH$_2$—, —CH$_2$CH$_2$CH(CH$_3$)—, and —CH$_2$CH(CH$_2$CH$_3$)—. Polyorganosiloxanes (a) wherein the R'' radical is —CH$_2$CH$_2$CH$_2$— are preferred because of their ease of preparation and/or greater hydrolytic stability relative to the polyorganosiloxanes having other R'' radicals of the group recited above. Polyorganosiloxane (a) can have either a single type of acrylate-containing siloxane unit, e.g. methacryloxypropylsiloxane units or there can be present in (a) a number of different types of acrylate-containing siloxane units varying in the nature of R and/or R'', e.g. acryloxypropylsiloxane units and acryloxyisopropylsiloxane units or methacryloxymethylsiloxane units and acryloxymethylsiloxane units.

The acrylate-containing siloxane units and any siloxane units free of acrylate-containing radicals can have silicon-bonded R' radicals. R' can be independently a monovalent hydrocarbon radical free of aliphatic unsaturation such as an alkyl such as methyl, ethyl, propyl, isopropyl, butyl; a cycloalkyl radical such as cyclopentyl and cyclohexyl, and aryl radical such as phenyl, tolyl and xenyl; a halogenated monovalent hydrocarbon radical free of aliphatic unsaturation such as a halogenated alkyl radical such as chloromethyl, chloropropyl, bromobutyl and 3,3,3-trifluoropropyl; or a halogenated aryl radical such as alpha, alpha, alphatrifluorotolyl and chlorophenyl. Polyorganosiloxanes (a) wherein R' has no more than eight carbon atoms are preferred since the starting materials bearing R' radicals that are used for preparing such polyorganosiloxanes are more easily distilled than starting materials wherein the R' radical has more than eight carbon atoms. Polyorganosiloxanes (a) wherein R' is methyl, phenyl, or 3,3,3-trifluoropropyl have superior properties such as oxidative stability, radiation resistance or oil resistance and are therefore highly preferred for the compositions of this invention.

The acrylte-containing siloxane units of polyorganosiloxane (a) can have up to two siliconbonded R' radicals per siloxane unit, i.e. x can be 0, 1, or 2. When x is two the R' radicals can be identical to or different from each other. Any siloxane units of polyorganosiloxane (a) which are not acrylate-containing can have up to three R' radicals per siloxane unit, i.e. y can be 0, 1, 2, or 3. When y is 2 to 3 the R' radicals can be identical to or different from each other.

Siloxane units which are highly preferred in polyorganosiloxane (a) include, acrylate-containing siloxane units such as, where A is an acryloxyalkyl radical or a methacryloxyalkyl radical hereinbefore described, ASiO$_{3/2}$, ACH$_3$SiO, A(CH$_3$)$_2$SiO$_{1/2}$, A(CH$_3$)(C$_6$H$_5$)SiO$_{1/2}$, A(C$_6$H$_5$)SiO and A(CF$_3$CH$_2$CH)SiO and $$R'_y SiO_{\frac{4-y}{2}}$$

units such as SiO$_{4/2}$, CH$_3$SiO$_{3/2}$, C$_6$H$_5$SiO$_{3/2}$, CF$_3$CH$_2$CH$_2$SiO$_{3/2}$, (CH$_3$)$_2$SiO, CH$_3$(C$_6$H$_5$)SiO, CH$_3$(CF$_3$CH$_2$CH$_2$)SiO, (C$_6$H$_5$)$_2$SiO, (CH$_3$)$_3$SiO$_{1/2}$, and (CH$_3$)$_2$(C$_6$H$_5$)SiO$_{1/2}$.

It is to be understood that while the polyorganosiloxanes (a) of the compositions of this invention are essentially fully condensed materials, there are present in any polyorganosiloxane (a) varying small amounts of silicon-bonded hydroxy and/or alkoxy groups that are usually present in commercial polyorganosiloxane.

To be curable under anaerobic conditions the compositions of this invention should comprise a polyorganosiloxane (a) wherein at least two siloxane units are acrylate-containing siloxane units. Any remaining siloxane units in the polyorganosiloxane (a) are free of acrylate-containing radicals. In addition, polyorganosiloxane (a) should have a degree of functionality, hereinafter defined, with a value of from 2.2 to 5.0. Compositions of this invention wherein the degree of functionality of the polyorganosiloxane (a) is less than 2.2, for example 2.1, fail to cure under anaerobic conditions at room temperature. Compositions of this invention wherein the degree of functionality of the polyorganosiloxane (a) has a degree of functionality of greater than 5.0, for example 6.0, are not expected to be stable at room temperature and will probably rapidly cure, even in the presence of oxygen. Compositions of this invention wherein the polyorganosiloxane (a) has a degree of functionality of 5.0 are anaerobically curing compositions and are part of this invention, but they have limited shelf life and are not regarded as storable compositions. Compositions of this invention wherein the polyorganosiloxane (a) has a degree of functionality of from 2.2 to 4.0 are preferred because said compositions possess long term shelf stability in the presence of oxygen and yet will cure readily in the absence of oxygen.

Thus, polyorganosiloxane (a) can have any combination of acrylate-containing siloxane units and acrylate-free siloxane units wherein there is present any combination of the stated R, R' and R'' radicals in the stated amounts as long as at least two of the siloxane units are acylate-containing siloxane units and the degree of functionality of the polyorganosiloxane (a) has a value of from 2.2 to 5.0.

Polyorganosiloxane (a) is soluble in at least one common organic solvent. Common organic solvents are, of course, well known and include hydrocarbons such as benzene, toluene, xylene, cyclohexane, heptane, and octane; halogenated hydrocarbons such as methylene chloride, chloroform, carbon tetrachloride, chlorobenzene, benzotrifluoride and trichloroethylene; oxygenated solvents such as acetone, methyl isobutyl ketone, ethyl acetate, dioxane and tetrahydrofuran and others such as carbon bisulfide, dimethyl sulfoxide and N,N-dimethylformamide.

Polyorganosiloxane (a) can vary in viscosity from a low molecular weight, low viscosity fluid to a high viscosity material such as a solid resin which may be easily used in an anerobically curing composition only when dispersed in a liquid medium such as a volatile organic solvent. Preferably, polyorganosiloxane (a) is a liquid.

The degree of functionality of polyorganosiloxane (a) can be calculated in the following manner. The functionality of an acryloxyalkyl group or a methacryloxyalkyl group is 2. The functionality of a silicon-bonded oxygen is 2. The functionality of a siloxane unit is therefore 2 times the number of acrylate and/or methacrylate groups plus 2 times the number of silicon-bonded oxygens in the siloxane unit. For example, the functionality of $(CH_3)_3SiO_{1/2}$ is $2 \times 1/2 = 1$. The functionality of $CH_2\text{=}CHCO_2(CH_2)_3SiO_{3/2}$ is $(2 \times 1) + (2 \times 3/2) = 5$. The degree of functionality of a polyorganosiloxane is 0.01 times the sum of the products of the mole percent of each siloxane unit times its functionality for all siloxane units in polyorganosiloxane (a). For example, a polyorganosiloxane consisting essentially of 30 mole percent of $CH_2\text{=}C(CH_3)CO_2(CH_2)_3SiO_{3/2}$ units (functionality = 5), 10 mole percent of $CH_2\text{=}CHCO_2CH_2Si(CH_3)O$ units (functionality =4), 50 mole percent $(CH_3)_2SiO$ units (functionality = 2) and 10 mole percent of $(CH_3)_3SiO_{1/2}$ units (functionality = 1) would be equal to $0.01\{(30 \times 5) + (10 \times 4) + (50 \times 2) + (10 \times 1)\} = 0.01(150 + 40 + 100 + 10) = 3$.

Polyorganosiloxane (a) can be prepared by any suitable method for making polyorganosiloxanes having acrylate-containing siloxane units. These methods fall into two general classes. In one general method a polyorganosiloxane comprising an appropriate number of sites of suitable functionality is prepared and the suitable functionality is subsequently converted to the desired acrylate functionality. For example, a polyorganosiloxane having an appropriate number of silicon-bonded chloromethyl groups is prepared by conventional techniques and the chloromethyl groups are subsequently converted to acryloxymethyl groups and/or methacryloxymethyl groups by reaction with an alkali metal salt of acrylic acid and/or methacrylic acid respectively. Alternately the chloromethyl groups can be reacted with acrylic acid and/or methacrylic acid in the presence of an HCl acceptor such as triethylamine. Another example of this first general method for preparing polyorganosiloxane (a) entails preparing a polyorganosiloxane containing an appropriate number of silicon-bonded hydrogen atoms and subsequently reacting an unsaturated ester, e.g. a vinyl ester or an allyl ester, of acrylic acid and/or methacrylic acid with the silicon-bonded hydrogen atoms in the presence of a platinum-containing catalyst. In a second general method for preparing polyorganosiloxane (a) acrylate-containing silanes and/or siloxanes, and, optionally, acrylate-free silanes and/or siloxanes, are equilibrated using well-known techniques such as hydrolysis and condensation of the appropriate chlorosilanes under acidic conditions or the equilibration of the appropriate siloxanes and/or alkoxy silanes, using acid catalysis. For example, a mixture of dimethylcyclopolysiloxanes, hexamethyldisiloxane and $CH_2\text{=}CHCO_2(CH_2)_3Si(OCH_3)_3$ in the appropriate amounts can be equilibrated in the presence of an acid catalyst to produce a polyorganosiloxane (a) having $(CH_3)_2SiO$ units, $(CH_3)_3SiO_{1/2}$ units and $CH_2\text{=}CHCO_2(CH_2)_3SiO_{3/2}$ units.

This second general method is preferred for the preparation of polyorganosiloxane (a) since better control of the number of acryloxyalkyl or methacryloxyalkyl groups in polyorganosiloxane (a) can be achieved. In the first general method, the reactions that are used to place the acrylate group into the preformed polyorganosiloxane are often times not quantitative reactions and/or sometimes produce minor amounts of undesirable by-products. It is to be understood, however, that both general methods are appropriate for the preparation of polyorganosiloxane (a). These and other examples of general methods that are suitable for preparing polyorganosiloxane (a) are shown in U.S. Pat. Nos. 2,793,223, 2,898,361, 2,922,806, 2,922,807, and 2,956,044 which are hereby incorporated by reference to show the method of preparation of polyorganosiloxane (a). The best method of preparing polyorganosiloxane (a) is illustrated in Examples 1 and 2 given below.

The compositions of this invention also comprise a hydroperoxy polymerization initiator (b) which is ineffective to cure said compositions in the presence of oxygen but which will be effective to cure said compositions when they are placed in contact with certain metals and oxygen is excluded. These hydroperoxy polymerization initiators are well known in the art of anaerobically curing compositions and many are commercially available. Preferred are the organic hydroperoxides such as cumene hydroperoxide and tertiarybutyl hydroperoxide. It was not expected that compositions comprising certain polyorganosiloxanes (a) with their large amount of dissolved oxygen and high permeability to oxygen and a hydroperoxy polymerization initator that is known to be effective for "organic" polymerizable monomers would be anaerobically curing compositions.

An effective amount of a hydroperoxy polymerization initiator to be used in the compositions of this invention is merely the amount needed to cure the composition in the desired length of time after the composition has been excluded from oxygen. Hydroperoxy polymerization initiator (b) may be used in concentrations as low as 0.01 percent by weight of the composition but a preferable concentration is from 1 to 10 percent by weight of initiator (b) based on the total weight of the anaerobically curing composition.

The compositions of this invention can also comprise stabilizers and accelerators such as primary accelerators and secondary accelerators, the purpose of which is to stabilize said compositions during storage and provide controllable curing rates when oxygen is excluded from said compositions.

The hydroperoxy polymerization initiators, the stabilizers and the various accelerators are taught in U.S. Pat. Nos. 2,895,950, 3,043,820, 3,046,262, and 3,425,988 which are hereby incorporated by reference to show suitable initiators, stabilizers and accelerators and their use in anaerobically curing compositions.

The compositions of this invention can also comprise components such as fillers, pigments, and additives which are common to the organosilicon art as long as said components do not adversely effect the anaerobic curing properties of said compositions.

The compositions of this invention are prepared by mixing, under ambient conditions and in the absence of active metals, the appropriate amount of polyorganosiloxane (a), the hydroperoxy polymerization initiator and any other appropriate components, using any of the techniques which are common to the polymer art, such as blending and stirring.

By the term ambient conditions it is meant that oxygen is not excluded from the composition and the temperature of the composition is approximately equal to room temperature. By the term active metal it is meant those metals that are well known to catalyze the anaerobic curing process in the presence of a hydroperoxy initiator. Examples of active metals include iron, steel, nickel, copper, bronze, brass, commercial aluminum cobalt, manganese and beryllium. The compositions of this invention can be prepared and used immediately, if desired, or said compositions wherein the degree of functionality has a value of from 2.2 to less than 5.0, for example, from 2.2 to 4.0, can be prepared and stored for long periods of time prior to their intended use. It is only necessary to maintain contact between said compositions and oxygen in the well known manner and to avoid the presence of even small amounts of active metals to prevent the storable compositions from curing.

When the compositions of this invention are brought into contact with an activating surface such as an active metal surface, and oxygen is not allowed to contact said composition, such as when the compositions are applied to threads of a steel bolt and/or nut and the nut is threaded onto the bolt, a relatively rapid curing reaction takes place whereupon the polyorganosiloxane (a) is polymerized to an insoluble solid. This curing reaction can be accelerated with heat; however, in most instances the curing reaction is sufficiently rapid at room temperatures. The compositions of this invention can also be cured by heating in the presence or absence of air in the well-known manner.

The compositions of this invention cure to solid materials which are insoluble in common organic solvents and are characterized by improved thermal stability relative to the anaerobically curing compositions that are based on polyalkylene ether polymerizable monomers. Simple thermogravimetric analysis in a nitrogen atmosphere is used to evaluate the thermal stability of a composition. The temperature at which rapid weight loss begins is noted and is designated the upper limit temperature for the composition. The upper limit temperature is an indication of the lowest temperature at which the composition will have no useful life because of thermal degradation of the composition.

The efficacy of the compositions of this invention as anaerobically curing sealant compositions is determined by the well known prevailing torque test. In this test several drops of the composition to be tested are placed on the threads of a metal bolt and/or nut, the nut is threaded on to the bolt and the resulting assembly of nut, bolt and composition is kept at room temperature for a period of time while the composition between the bolt and the nut cures. At the end of a specified length of time the torque required to produce relative motion between the nut and bolt of an assembly is noted at 90°, 180°, 270°, and 360° of rotation. The prevailing torque for the assembly is the average of the four torque measurements so taken. A composition is said to have some utility if it provides a prevailing torque of at least 12 inch pounds (1.4 Newton-meter (N.m)) on a ⅜ inch (9.5 mm) nut and bolt assembly.

The efficacy of the compositions of this invention as an anaerobically curing sealant in an environment of sustained thermal stres below the upper limit temperature of the composition is measured with the use of the prevailing torque test described above. Several bolt and nut assemblies, prepared according to the directions given above, are cured for 24 hours at room temperature and are then placed into an oven maintained at 200° C. ± 5° C. Specimen assemblies are removed periodically and the prevailing torque is measured. A composition whose prevailing torque value changes little over a period of days or weeks at 200° C. is a desirable composition.

The compositions of this invention are useful in a method for sealing the small volumes between two or more surfaces, at least one surface of which is an activating surface such as an active metal such as the volume between the two mating portions of surfaces brought into close proximity. Examples of an activating surface include the surface on an active metal, hereinbefore described and the surface of an inactive material such as glass, cadmium, titanium and zinc, or the surface of an inhibiting surface such as certain anodized surfaces, oxide finishes and chromate finishes having deposited thereon an active metal or any of the activating priming compositions that are well known in the anaerobic sealant art. Examples of two mating surfaces brought into close proximity, in addition to the aforementioned nut and bolt assembly, include a concentric arrangement of parts such as a cylinder placed in a tube having an inside diameter slightly larger than the outside diameter of the cylinder or a parallel arrangement of parts such as one flat surface pressed onto another flat surface. Other examples will be obvious to one skilled in the art. The compositions of this invention can be positioned onto and in contact with said surfaces by any suitable means such as spreading or dipping and the surfaces then brought into close proximity. Any solvent which may be present should be allowed to evaporate before the surfaces are brought into close proximity. Alternately, when said compositions have sufficient fluidity, the surfaces can be brought into close proximity and the composition subsequently positioned, e.g. by capillary action, into the small volume between and in contact with the surfaces. The composition, however positioned and enclosed by the surfaces, being effectively excluded from oxygen, cures to an insoluble solid and adheres to said surfaces, thereby providing an asembly with two or more surfaces held in a fixed relative configuration.

The compositions of this invention combine the thermal stability of silicones with the useful technology of anaerobic polymerization to produce new and improved anaerobically curing, thermally stable compositions.

The following examples which illustrate this invention should not be construed as limiting the invention which is properly delineated by the appended claims. All parts are parts by weight unless otherwise stated.

EXAMPLE 1

A mixture of 66 molar parts of $(CH_3)_3SiCl$ and 34 molar parts of $CH_2=C(CH_3)CO_2(CH_2)_3SiCl_3$ dissolved in an amount of toluene equal to 60 percent of the weight of the mixture of chlorosilanes was slowly admixed with an amount of water equal to 10 times the theoretical amount needed to hydrolyze all the silicon-chlorine bonds in the mixture. The temperature of the hydrolysis mixture was maintained at approximately 45° C. during the admixing. The aqueous phase was separated and the toluene phase was washed with an equal volume of water and the wash water was separated and tested with pH paper. This washing process was repeated 5 times until the wash water was no longer acidic according to pH paper. The toluene phase was then dried with anhydrous sodium sulfate, filtered and volatile material was stripped off. The non-volatile methacryloxypropyl-containing polyorganosiloxane was analyzed by hydrogen nuclear magnetic resonance spectroscopy and found to consist essentially of 52 mole percent $(CH_3)_3SiO_{1/2}$ units and 48 mole percent $CH_2=C(CH_3)CO_2(CH_2)_3 - SiO_{3/2}$ units, resulting in a degree of functionality of 2.92.

A composition consisting essentially of 95.45 parts of the polyorganosiloxane prepared above, 2.50 parts of cumene hydroperoxide, 0.50 parts ortho-benzoic sulfimide, 0.05 parts of para-benzoquinone, 1.00 part of N,N-diethyl-p-toluidine and 0.50 parts of dimethylsulfoxide (solvent for the sulfimide) was prepared by admixing the minor components to the major component. A few drops of the resulting composition was placed on the threads of a ⅜ inch (9.5 mm) unplated iron bolt and a nut was fully threaded onto the bolt. After 24 hours at room temperature the assembly had a prevailing torque of 13 Newton-meters (N.m). Another assembly having the above composition applied to its threads had a prevailing torque of 16 N.m after 48 hours at room temperature.

Several nut and bolt assemblies having the above composition applied to the threads thereof were cured at room temperature for 24 hours and then placed into an oven maintained at 200° C. A specimen assembly was removed from the oven periodically, cooled to room temperature and its prevailing torque was measured. Table I lists the prevailing torque for the assemblies of this example as well as the prevailing torque for three similarly treated assemblies treated with commercially available anaerobically curing sealant compositions that are based on polyalkylene ether polymerizable monomers. This test illustrates the efficacy of the compositions of this invention as a sealant in an environment of sustained thermal stress.

Several other polyorganosiloxanes were prepared by the method of this example and formulated into an anaerobically curing composition. Table II lists the composition of the polyorganosiloxanes and the prevailing torque and the upper limit temperature (hereinbefore described) of the cured compositions.

TABLE I

| Composition | Initial Prevailing Torque 24 hrs./25° C. | Prevailing Torque (% of Initial Prevailing Torque) after indicated number of days at 200° C. | | | | | |
|---|---|---|---|---|---|---|---|
| | | 1 | 2 | 3 | 4 | 6 | 9 |
| Polyorganosiloxane Composition of Example 1. | 12 N·m | 76 | 68 | 111 | 106 | 95 | 114 |
| Non-silicone Commercial Sealant A | 23 N·m | 87 | 72 | 81 | 62 | 15 | 5 |
| Non-silicone Commercial Sealant B | 3.4 N·m | 133 | 187 | 200 | 110 | 83 | 73 |
| Non-silicone Commercial Sealant C | 2.8 N·m | 60 | 100 | 52 | 60 | 84 | 20 |

TABLE II

| Composition Number | Polyorganosiloxane Composition-Mole % | | | Degree of Functionality | Prevailing Torque-N·m | | Upper Limit Temperature |
|---|---|---|---|---|---|---|---|
| | $(CH_3)_3SiO_{1/2}$ | MAP $SiO_{3/2}$[1] | Other | | 24hr./25° C | 48hr./25° C | |
| 1 | 42 | 58 | 0 | 3.32 | 20.7 | 13.9 | 350° C |
| 2 | 29 | 71 | 0 | 3.84 | 12.2 | 16.0 | 385° C |
| 3 | 52 | 48 | 0 | 2.92 | 12.9 | 15.8 | [4] |
| 4 | 42 | 30 | 28[2] | 3.06 | 6.0 | [4] | 380° C |
| 5 | 41 | 44 | 15[2] | 2.66 | 10.3 | [4] | 375° C |
| 6 | 14 | 66 | 20[3] | 3.04 | 3.3 | 6.3 | 335° C |
| 7 | 18 | 56 | 26[3] | 3.55 | 5.6 | [4] | [4] |
| 8 | Non-Silicone Commercial Sealant A. | | | — | 21.9 | 18.9 | 325° C |
| 9 | Non-Silicone Commercial Sealant B. | | | — | 4.3 | 5.9 | 275° C |
| 10 | Non-Silicone Commercial Sealant C. | | | — | 2.8 | 2.6 | 290° C |

[1] MAP = methacryloxypropyl = $CH_2=C(CH_3)CO_2(CH_2)_3-$ (All samples contain a detectable amount, but less than about 5 mole %, of the isomeric $CH_2=CHCH_2CO_2CH(CH_3)CH_2SiO_{3/2}$)
[2] Other is $C_6H_5SiO_{3/2}$
[3] Other is $C_6H_5(CH_3)SiO$
[4] Not measured

EXAMPLE 2

A mixture of 27.5 molar parts of $(CH_3)_3SiOSi(CH_3)_3$, 12 molar parts of $C_6H_5Si(OCH_3)_3$, and 33 molar parts of $CH_2=C(CH_3)CO_2(CH_2)_3Si(OCH_3)_3$ was added to 110 percent of the theoretical amount of water needed to hydrolyze all silicon-bonded methoxy groups in the mixture and a catalytic amount of $CF_3SO_3H$ was added. Toluene, 60 percent by weight based on the weight of the mixture of silicon compounds plus water, was added and the reaction mixture was heated to reflux to hydrolyze and equilibrate the silicon-containing compounds and to remove water and methanol by azeotropic distillation. The resulting polyorganosiloxane was treated with sufficient $CaCO_3$ to neutralize the $CF_3SO_3H$ catalyst, filtered to remove insoluble material and the filtrate was stripped to remove toluene and other volatile materials. The non-volatile methacrylate-containing polyorganosiloxane was analyzed by hydrogen nuclear magnetic resonance spectroscopy and was found to consist essentially of 46 mole percent of $(CH_3)_3SiO_{1/2}$ units, 15 mole percent of $C_6H_5SiO_{3/2}$ units and 39 mole percent of $CH_2=C(CH_3)CO_2(CH_2)_3-SiO_{3/2}$ units, resulting in a degree of functionality of 2.86. The prevailing torque for this composition was 5.6 N·m after 24 hours at room temperature and 16 N·m after 48 hours at room temperature. This polyorganosiloxane and other polyorganosiloxanes made according to this method were used to prepare anaerobically curing compositions according to the formulation of Example 1. The results are summarized in Table III.

TABLE III

| Composition Number | Polyorganosiloxane Composition-Mole % | | | Degree of Func-tionality | Prevailing Torque-N · m | | Upper Limit Temperature |
|---|---|---|---|---|---|---|---|
| | $(CH_3)_3SiO_{1/2}$ | MAP $SiO_{3/2}$[1] | $C_6H_5SiO_{3/2}$ | | 24 hr./25° C | 48hr./25° C | |
| 1 | 46 | 39 | 15 | 2.86 | 5.6 | 15.9 | 330° C |
| 2 | 46 | 26 | 28 | 2.60 | 4.1 | 19.2 | 315° C |
| 3 | 58 | 42 | 0 | 2.68 | 1.1 | (2) | 325° C |
| 4 | 49 | 51 | 0 | 3.04 | 0.6 | 11.5 | 375° C |
| 5 | 0 | 100 | 0 | 5.00 | 14.1 | (2) | (2) |
| 6 | Non-silicone Commercial Sealant D | | | — | 0.6 | 1.4 | 330° C |
| 7 | Non-silicone Commercial Sealant E | | | — | 5.2 | 4.3 | 300° C |
| 8 | Non-silicone Commercial Sealant F | | | — | 6.8 | 18.6 | 290° C |

[1]MAP = Methacryloxypropyl = $CH_2\!=\!C(CH_3)CO_2(CH_2)_3\!-$
[2]Not measured

EXAMPLE 3

A polyorganosiloxane fluid, 154 grams, consisting essentially of 88.2 molar parts of $ClCH_2CH_2CH_2(CH_3)SiO$ units and 11.8 molar parts of $(CH_3)_3SiO_{1/2}$ units was treated with a solution of 110.5 grams (1.3 moles) of methacrylic acid, and 112.5 grams (1.10 moles) of triethylamine in 300 grams of dry xylene containing 4 grams of hydroquinone as a polymerization inhibitor. The reaction mixture was refluxed for 4 hours, cooled, filtered, and the filter cake was washed twice with dry xylene. The combined xylene portion was washed once with 10 percent aqueous NaOH, once with 15 percent aqueous NaCl and once with 25 percent aqueous NaCl. The xylene phase was dried, filtered, and then heated to 90° C at 0.5 kilopascals (4 mm of Hg) pressure to remove volatile materials. The non-volatile methacrylate-containing polyorganosiloxane was analyzed by hydrogen nuclear magnetic resonance spectroscopy and found to consist essentially of 12 mole percent $(CH_3)_3SiO_{1/2}$ units, 47 mole percent $ClCH_2CH_2CH_2(CH_3)SiO$ units and 41 mole percent of $CH_2\!=\!C(CH_3)CO_2(CH_2)_3Si(CH_3)O$ units.

This polyorganosiloxane and two other polyorganosiloxanes prepared by this method were formulated into anerobically-curing compositions and tested for prevailing torque values as described above. The results are summarized in compositions 1-3 in Table IV. This example demonstrates the need for a polyorganosiloxane with a degree of functionality of at least 2.2.

where R is H or $CH_3$, R' is an organic radical free of aliphatic unsaturation selected from the group consisting of monovalent hydrocarbon radicals and halogenated monovalent hydrocarbon radicals, R'' is a divalent alkylene radical of from 1 to 4 inclusive carbon atoms, and x is 0, 1, or 2, any remaining siloxane units in the polyorganosiloxane having the formula $$R'_y SiO_{\frac{4-y}{2}}$$

wherein R' is as defined above and y is an integer from 0 to 3 inclusive, said polyorganosiloxane having a degree of functionality of from 2.2 to 5.0,
  b. an effective amount of a hydroperoxy polymerization initiator, and
  c. an effective amount of a storage stabilizer, said anaerobically curing composition remaining uncured in the presence of oxygen at room temperature but curing to an insoluble solid in the absence of oxygen.

2. The composition of claim 1 wherein x has a value of 0 or 1 and R'' is $-CH_2CH_2CH_2-$.

3. The composition of claim 2 wherein R is $CH_3$ and R' is selected from the group consisting of $CH_3$, 3,3,3-trifluoropropyl and phenyl.

4. The composition of claim 3 wherein the polyorganosiloxane fluid (a) has a degree of functionality of from 2.2 to 4.0.

5. The composition of claim 4 wherein the hydroperoxy polymerization initiator is cumene hydroperoxide.

TABLE IV

| Composition Number | Polyorganosiloxane Composition - Mole % | | | | | Degree of Func-tionality | Prevailing Torque N · m |
|---|---|---|---|---|---|---|---|
| | $(CH_3)_3SiO_{1/2}$ | $(CH_3)_2SiO$ | $(CH_3)Cl(CH_2)_3SiO$ | MAP $SiO_{3/2}$[1] | MAP $(CH_3)SiO$[1] | | |
| 1 | 12 | 0 | 47 | 0 | 41 | 2.70 | 4.1 |
| 2 | 7 | 65 | 14 | 0 | 14 | 2.21 | <1.4 |
| 3 | 2 | 88 | 5 | 0 | 5 | 2.08 | no cure[4] |
| 4[2] | 75 | 0 | 0 | 25 | 0 | 2.00 | no cure |
| 5[3] | 0 | 99.3 | 0 | 0.7 | 0 | 2.02 | no cure[4] |

[1]MAP = Methacryloxypropyl = $CH_2\!=\!C(CH_3)CO_2(CH_2)_3\!-$
[2]{$(CH_3)_3SiO$}$_3Si(CH_2)_3O_2CC(CH_3)\!=\!CH_2$
[3]MAP $(OCH_3)_2SiO\{(CH_3)_2SiO\}_{300}Si(OCH_3)_2$ MAP
[4]Cured when heated to 150° C for 15 minutes. Torque not measured.

That which is claimed is:
1. An anaerobically curing composition comprising:
  a. a polyorganosiloxane, soluble in at least one common organic solvent, consisting essentially of at least two siloxane units of the formula

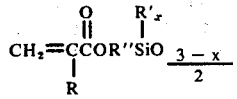

6. The composition of claim 1 comprising a curing rate accelerator.

7. A method comprising:
  i. positioning the composition of claim 1 into the small volume between and in contact with the mating portions of at least two surfaces brought into close proximity, at least one surface being an activating surface, thereby excluding oxygen from the composition, ii. allowing the composition so positioned and excluded from oxygen to cure, whereby the surfaces brought in close proximity are held in fixed relative configuration.

8. A method comprising:
i. positioning the composition of claim 5 into a small volume between and in contact with the mating portions of at least two surfaces brought into close proximity, at least one surface being an activating surface, thereby excluding oxygen from the composition, ii. allowing the composition so positioned and excluded from oxygen to cure, the surfaces brought into close proximity are held in fixed relative configuration.

9. The assembly produced by the method of claim 7.
10. The assembly produced by the method of claim 8.

* * * * *

UNITED STATES PATENT AND TRADEMARK OFFICE
CERTIFICATE OF CORRECTION

PATENT NO. : 4,035,355
DATED : July 12, 1977
INVENTOR(S) : Ronald H. Baney, et al.

It is certified that error appears in the above–identified patent and that said Letters Patent are hereby corrected as shown below:

Column 3, Line 47, after the word "alkyl" insert --radical--.

Column 4, Line 5, delete the word "to" and insert therefor the word --or--.

Signed and Sealed this

Twenty-third Day of December 1980

[SEAL]

Attest:

SIDNEY A. DIAMOND

Attesting Officer

Commissioner of Patents and Trademarks